United States Patent [19]
Yamada et al.

[11] 3,997,650
[45] Dec. 14, 1976

[54] PROCESS FOR EXTRACTING ALUMINA FROM ALUMINA-CONTAINING ORES

[75] Inventors: Koichi Yamada; Masao Yoshihara; Takahiro Ishida, all of Niihama, Japan

[73] Assignee: Sumitomo Chemical Company, Limited, Osaka, Japan

[22] Filed: Sept. 8, 1975

[21] Appl. No.: 611,155

[30] Foreign Application Priority Data

Sept. 28, 1974 Japan .................. 49-111903

[52] U.S. Cl. .................. 423/119; 423/121; 423/127; 423/131
[51] Int. Cl.² .......................... C01F 7/06
[58] Field of Search .......... 423/119, 131, 121, 127

[56] References Cited

UNITED STATES PATENTS

| | | | |
|---|---|---|---|
| 2,869,984 | 1/1959 | Spence .................. | 423/119 |
| 3,413,087 | 3/1964 | Roberts .................. | 423/131 |
| 3,481,705 | 12/1969 | Peck et al. .................. | 423/131 |

*Primary Examiner*—Herbert T. Carter
*Attorney, Agent, or Firm*—Stevens, Davis, Miller & Mosher

[57] ABSTRACT

In a process for extracting alumina from alumina-containing ores by individually preheating a slurry of alumina-containing ores in alkali solution, and an alkali solution, and feeding the preheated slurry and the preheated alkali solution to a digester maintained at a temperature of about 200° to about 300° C, thereby extracting alumina from the alumina-containing ore. The alumina extraction is carried out without any formation of scales on the inside surface of the preheater with a considerably prolonged operating duration by preparing a slurry having a molar ratio of $Na_2O/Al_2O_3$ of not more than 1 from the alumina-containing ores and an alkali solution, subjecting the slurry to preliminary desilication treatment, if necessary, then adding an alkali material to the slurry while preheating the slurry before the slurry reaches a temperature of forming scales originating from deposition of boehmite-type alumina from the slurry, thereby obtaining the slurry having an adjusted molar ratio of $Na_2O/Al_2O_3$ of more than 1, further preheating the slurry having the adjusted molar ratio to a temperature higher than that of forming scales originating from deposition of boehmite-type alumina from the slurry before the adjustment of the molar ratio, and then extracting the alumina from the alumina-containing ores in the slurry admixed with a separately preheated alkali solution in the digester.

12 Claims, 2 Drawing Figures

PROCESS FOR EXTRACTING ALUMINA FROM ALUMINA-CONTAINING ORES

This invention relates to a process for extracting alumina from alumina-containing ores, and more particularly to a process for extracting alumina from alumina-containing ores (which will be hereinafter referred to as bauxite) by individually preheating a slurry of bauxite in alkali solution, and an alkali solution, mixing the preheated slurry with the preheated alkali solution, thereby effecting extraction of alumina from the bauxite, that is, a novel process for extracting alumina from bauxite by applying to said slurry a treatment to prevent formation of scales originating from deposition of boehmite-type alumina (the scales will be hereinafter referred to as boehmite scales) in the socalled two-stream system, thereby preventing deposition of the scales onto a slurry preheater and attaining an effective utilization of heat recovered from the extraction effluent at the same time.

The Bayer process is more often used for extraction of alumina from bauxite, and comprises an extraction step of subjecting pulverized bauxite to extraction with an alkali solution such as a caustic soda solution or a mixed solution of caustic soda and sodium carbonate, thereby obtaining a slurry of sodium aluminate solution supersaturated with alumina, in which alkali-insoluble residues other than alumina, for example, iron oxide, silicates, titanium oxide, etc. are suspended; a red mud separation step of separating said insoluble residues from the resulting slurry, thereby obtaining a clear solution of sodium aluminate; a precipitation step of adding seed aluminum hydroxide to the clear solution of sodium aluminate, thereby precipitating aluminum hydroxide; and a recycle step of separating the precipitated aluminum hydroxide from the solution of sodium aluminate, recycling a portion of separated aluminum hydroxide precipitate as seed, and withdrawing the remaining portion of aluminum hydroxide precipitate as a product, while recycling the separated solution of sodium aluminate (which will be hereinafter referred to as a decomposition solution) to the extraction step for bauxite directly or after concentration.

The Bayer process can be further classified, on the basis of extraction procedure, into a one-stream system, in which the bauxite and the alkali solution necessary for the extraction are mixed together, and subjected to extraction after preheating, and a two-stream system, in which a slurry of alumina-containing ores in alkali solution and an alkali solution are mixed together after the latter alkali solution has been preheated with recovered steam, and then the mixture is subjected to extraction.

According to the two-stream process, a recycled decomposition solution is usually divided into a main stream taking typically 90% by volume of the total decomposition solution and a side stream taking typically 10% by volume of the total decomposition solution. The main stream of the decomposition solution is preheated to a temperature near the extraction temperature (usually about 170° C or higher) with steam recovered from an evaporator for cooling of the slurry resulting from the extraction, whereas the side stream is mixed with bauxite to obtain a slurry whose solid concentration may be about 20 to about 50 % by weight, and the resulting slurry is mixed with said preheated main stream of decomposition solution and the resulting mixture is charged into a digester and subjected to extraction.

Since the side stream is a slurry having a high solid concentration, scales are likely to deposit on an inside surface of the preheater from the slurry when heated, resulting in considerable reduction of heat transfer coefficient and heat recovery efficiency. Furthermore, an operating duration is shortened on for scale removal, or much labor or expenses are required for scale removal. On account of these serious disadvantages, the preheating is usually effected only up to approximately the boiling point of the slurry. Thus, the recovered steam is not effectively utilized, and steam utility is considerably lowered.

To improve these disadvantages, a process has been proposed, which comprises heating the slurry to a temperature of about 70° to about 250° C in advance, thereby effecting the so-called preliminary desilication treatment, then preheating the slurry to a temperature near the extraction temperature, thereby depositing silica components of the slurry as desilication products before preheating, preventing formation of scales in the preheater and reducing the amount of scales to be deposited onto the inside surface of the preheater (U.S. Pat. No. 3,413,087). Said prior process is excellent in the sense of preventing formation of scales originating from the desilication products. To utilize the feature of the two-stream system to a maximum, it is desirable to preheat the slurry to a temperature as high as possible, for example, a temperature near the extraction temperature.

However, the preliminary desilication treatment is usually carried out at the boiling point of the slurry, but when the slurry resulting from the preliminary desilication treatment is preheated to a temperature near the extraction temperature, it is impossible to prevent formation of scales onto the inside surface of the preheater in spite of the preliminary desilication treatment conducted in advance. Furthermore, the deposited scales are sparingly soluble in a mineral acid, and also hardly peelable.

The present inventors made extensive studies concerning how the scales were formed on the inside surface of the preheaters under such situations, and have found, as a result of examination of the scales formed from the slurry resulting from the preliminary desilication treatment, that the scales consisted mainly of boehmite-type alumina, that is, the scales were comprised of scales originating from the desilication products and those originating from deposition of boehmite-type alumina, and that the deposition of the boehmite scales depended upon a molar ratio of $Na_2O/Al_2O_3$ of the slurry, that is, the boehmite scales were formed only at $Na_2O/Al_2O_3$ of not more than 1, and not at $Na_2O/Al_2O_3$ of more than 1. The present inventors have conceived the present invention on the basis of the foregoing findings.

An object of the present invention is to prevent deposition of scales onto the inside surface of a slurry preheater and attain an effective utilization of heat recovered in an extraction step in a process for extracting alumina from bauxite, based on a two-stream system.

That is, the present invention provides a process for extracting alumina from alumina-containing ores by individually preheating a slurry of alumina-containing ores in alkali solution, and an alkali solution, and feeding the preheated slurry and the preheated alkali solution to a digester maintained at a temperature of about 200° to about 300° C, thereby extracting alumina from the alumina-containing ores, wherein an improvement comprises preparing from the alumina-containing ores and the alkali solution a slurry having a molar ratio of $Na_2O/Al_2O_3$ of not more than 1, subjecting the slurry to preliminary desilication treatment, if necessary, then adding an alkali material to the slurry while preheating the slurry before the slurry reaches a temperature of forming scales originating from deposition of boehmite-type alumina from the slurry, thereby obtaining the slurry having an adjusted molar ratio of $Na_2O/Al_2O_3$ of more than 1, further preheating the resulting slurry having the adjusted molar ratio to a temperature higher than that of forming scales originating from deposition of boehmite-type alumina from the slurry before the adjustment of the molar ratio, and then feeding the preheated slurry and the separately preheated alkali solution to a digester, thereby extracting alumina from the alumina-containing ores in the slurry.

The present process will be described in detail below.

The present process is applicable to the process of the so-called two-stream system, which comprises individually preheating a slurry of bauxite in alkali solution and an alkali solution, and feeding the preheated slurry and the preheated alkali solution to a digester kept at a temperature of about 200° to about 300° C, thereby extracting alumina from the bauxite.

In the practice of the present invention, recycled decomposition solution is divided into a main stream, and a side stream that makes a transportable slurry of bauxite having a molar ratio of $Na_2O/Al_2O_3$ [which means a molar ratio of alkali to total of readily soluble alumina (alumina trihydrate) in bauxite and alumina in the decomposition solution] of not more than 1, usually 0.2 –1, preferably 0.3 – 0.8. The proportion of the main stream to the side stream to be divided from the recycled decomposition solution depends upon kind of bauxite used, etc., but the recycled decomposition solution is usually divided at a proportion of the main stream to the side stream of 60–95% main stream to 40–5% side stream.

If the molar ratio of $Na_2O/Al_2O_3$ of the prepared slurry is more than 1, an amount of the recycled decomposition solution to the slurry preheater, where the formation of scales occurs, is increased, and consequently the high heat recovery efficiency which is the characteristic of the two-stream system is lowered. In addition, a silica concentration is lowered, and an unpreferably prolonged retention time will be necessary for the preliminary desilication treatment, if effected.

The prepared slurry having said ratio of $Na_2O/Al_2O_3$ is led to a preheating step directly or after the preliminary desilication treatment.

The preliminary desilication treatment is carried out by keeping the slurry at a temperature above about 70° C but below a temperature of the formation of boehmite scales from the slurry, preferably 80° C to a boiling point of the slurry under the atmospheric pressure, for about ½ to about 12 hours or more.

Temperature of forming boehmite scales depends upon the molar ratio of the $Na_2O/Al_2O_3$ of slurry, kinds of the bauxite used, etc., but usually is about 130° to about 170° C. For example, at a molar ratio of $Na_2O/Al_2O_3$ of 0.5, boehmite scales are formed at 160° to 170° C for the bauxite of South-East Asian origin, and 130° to 140° C for the bauxite of Australian origin.

The temperature of forming boehmite scales can be readily determined by the application of X-ray or differential thermal analysis for the formed scales, thereby confirming the presence of boehmite-type alumina in the scales.

A heat source for the preliminary desilication treatment is the steam recovered in an evaporator for cooling the slurry after extraction or steam from the outside of system. Heating can be effected by direct injection of live steam or by indirect heating. The slurry resulting from the preliminary desilication treatment or the slurry not subjected to the preliminary desilication treatment is usually led to a preheating step, where the slurry is preheated to a temperature above that of forming boehmite scales from the slurry, usually a temperature near the extraction temperature, that is, usually above about 170° C, preferably above 180° C.

However, according to the present process, an alkali material is added to the slurry while preheating the slurry before the slurry reaches a temperature of forming the boehmite scales from said slurry, thereby adjusting the slurry to have a molar ratio of $Na_2O/Al_2O_3$ of more than 1, preferably 1.05 to 1.3. The formation of boehmite scales on the inside surface of the slurry preheater and decrease in heat exchange efficiency of the slurry preheater can be prevented thereby, and the utility of recovered steam and operating life of the slurry preheater can be also increased. Furthermore, labor and expenses for removing the deposited scales can be reduced.

The alkali material is added to the slurry to prevent the deposition of boehmite scales while preheating the slurry before the slurry reaches a temperature of forming the boehmite scales, usually before the slurry reaches about 170° C after the preliminary desilication treatment preferably at 130° to 165° C, when the preliminary desilication treatment is carried out. It is not preferable to carry out the addition of alkali material above the temperature of forming the boehmite scales from the slurry, because it is quite impossible to prevent the formation of boehmite scales on the inside surface of the preheater in such a manner. The amount of the alkali material to be added to the slurry for preventing the formation of boehmite scales depends upon the molar ratio of $Na_2O/Al_2O_3$ of the slurry, $Na_2O$ concentration of the alkali material to be added, etc., but the alkali material is added to the slurry in such an amount that the resulting slurry can have a molar ratio of $Na_2O/Al_2O_3$ of more than 1.

Recycled decomposition solution, slurry after the extraction, alkali solution from the outside of system, etc. can be used as the alkali material to be added to the slurry. The main stream divided from the recycled decomposition solution, especially under preheating, is preferably used.

When all the amount of the main stream of the recycled decomposition solution is added to the slurry in that case, the formation of boehmite scales can be prevented as desired in the present invention, but formation of desilication scales cannot be completely eliminated from the slurry preheating step. Consequently, a decrease in heat exchange efficiency cannot be neglected when a mixture of a large amount of the main stream of the recycled decomposition solution and the slurry is preheated, and the characteristics of the two-stream system cannot be attained. Therefore, when the main stream of the recycled decomposition solution in the preheating line is added to the slurry as alkali material, not more than about 80%, usually 20 to 70% of the main stream of the decomposition solution is divided from the preheating line for the main stream and added to the slurry.

As described above, the addition of the alkali material to the slurry can prevent the formation of boehmite scales, but is not so effective for preventing the formation of desilication scales. The desilication reaction remarkably takes place at about 130° to about 170° C, and thus a retention vessel for the desilication reaction is provided at a position where the slurry preheating temperature is 130° to 170° C. The alkali material is added to the retention vessel for the desilication reaction to preferably effect the desilication reaction and the treatment to prevent the formation of boehmite scales at the same time.

Retention time of the slurry in the retention vessel for the desilication reaction depends upon silica content of the slurry, temperature, etc. but the slurry must be kept at said temperature usually for a retention time of at least about 3 minutes, preferably 5 to 60 minutes therein.

An autoclave, autoclave with a stirrer, etc. can be used as the retention vessel for the desilication reaction. The retention vessel for the desilication reaction is intended to effect the desilication reaction therein, and thus it is desirable to use a heat-insulated vessel having no heat transfer surface, but a vessel, which can be heated by injection of live steam or indirect heating, can be also used, if required. As a heating means for effecting the desilication, it is particularly preferable to utilize the heat of the main stream of the decomposition solution to be added to the slurry to prevent the formation of boehmite scales.

The slurry admixed with the alkali material to adjust the molar ratio in the manner as described above is further heated to a temperature above that of forming the boehmite scales from the slurry of unadjusted molar ratio, that is, the slurry before the adjustment of the molar ratio, preferably to a temperature near the extraction temperature, that is, about 170° C or higher.

The formation of the boehmite scales depends upon the kind of raw material bauxite and molar ratio of $Na_2O/Al_2O_3$ of the slurry, but generally starts to take place at about 130° to 170° C. The formation of such scales takes place at a molar ratio of $Na_2O/Al_2O_3$ of not more than 1, and thus when the alkali material is added to said slurry while preheating the slurry before the slurry reaches a temperature of forming the boehmite scales, thereby adjusting the molar ratio of $Na_2O/Al_2O_3$ of the slurry to more than 1, such formation of boehmite scales can be completely or substantially prevented throughout the preheating.

As the slurry preheater, a double-tube type heat exchanger, autoclave-type heat exchanger, shell-and-tube heat exchanger, etc. can be used.

In the present process, the main stream of the decomposition solution is heated to a temperature near the extraction temperature by the well known procedure, that is, by steam recovered in an evaporator for cooling the slurry after extraction, for example, by means of a double tube-type or shell-and-tube type heat exchanger.

In the present invention, the preheated slurry and the preheated main stream of the decomposition solution are led to the extraction step individually, or after joining together, and the extraction is effected therein.

In the present invention, it is not always necessary to preheat the slurry and the alkali solution in two completely independent streams. For example, the following procedure is also possible in the case of a slurry forming boehmite scales at 130° C. The alkali material is added to the slurry at a temperature below 130° C to adjust the molar ratio of the slurry, and then the resulting slurry having the adjusted molar ratio is further preheated, for example, up to 150° C, and then mixed with the main stream of the decomposition solution. Then, the mixture is further preheated up to a temperature near the extraction temperature, and then led to the digester.

The present invention will be described in detail below, referring to the accompanying drawings, but the present invention will not be restricted thereto.

Figure 1:
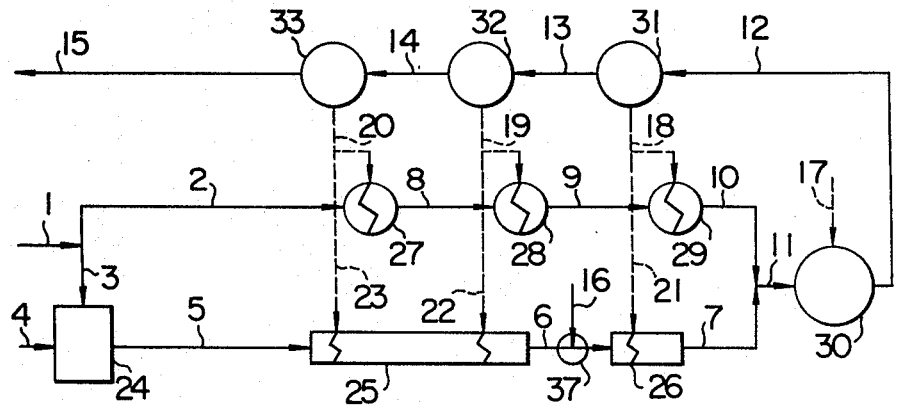
FIG. 1 is a flow diagram showing one embodiment of carrying out the present invention.

In FIG. 1, a recycled decomposition solution is fed through line 1, and is at first divided into main stream in line 2 and side stream in line 3.

Side stream in line 3 is mixed with alumina-containing ores such as bauxite, etc. supplied through line 4 in slurry preparation tank 24 to prepare a transferable slurry having a molar ratio of $Na_2O/Al_2O_3$ of not more than 1. The resulting slurry is led to preheater 25 through line 5 and preheated to a temperature below that of forming boehmite scales from the slurry in the preheater consisting usually of a double tube-type heat exchanger to which heat is supplied from evaporators for cooling 32, 33 through lines 20–23 and 19–22.

The slurry preheated to a temperature below that of forming boehmite scales from the slurry is led to retention vessel 37 for desilication reaction through line 6, and an alkali material is added to the slurry in the retention vessel through line 16 to adjust the molar ratio of $Na_2O/Al_2O_3$ of the slurry to more than 1.

As the alkali material, the main stream of decomposition solution in line 9 having a temperature similar to that of the slurry is usually used.

Furthermore, the decomposition solution at another position within the system, slurry after extraction, or alkali solution from the outside of the system can be used as the alkali material. Addition of the alkali material can be carried out at one location or separately at several locations.

The slurry having the adjusted molar ratio is led to heat exchanger 26 consisting usually of a double tube-type heat exchanger, to which heat is supplied from evaporator 31 for cooling through line 18–21, where the slurry is preheated to a temperature above that of forming boehmite scales from the slurry having the unadjusted molar ratio, that is, the slurry before the adjustment of the molar ratio, preferably a temperature near the extraction temperature, usually to 170° C or higher. No deposition of boehmite-type alumina takes place due to the alkali material added through line 16, and thus deposition of boehmite scales can be completely or substantially prevented in heat exchanger 26. In FIG. 1, it is shown that the alkali material is added to retention vessel 37 for the desilication reaction, but the alkali material can be supplied directly to line 6.

On the other hand, the main stream in line 2 is preheated to a temperature near the extraction temperature, usually to 170° C or higher by heat exchangers 27, 28 and 29, each consisting usually of a shell-and-tube type heat exchanger, through lines 8 and 9. Heat is supplied to the heat exchangers from evaporators for cooling 33, 32 and 31 through lines 20, 19 and 18, respectively.

The main stream of decomposition solution preheated to the temperature near the extraction temperature, and the slurry preheated, after the addition of alkali material, to the temperature above that of forming boehmite scales from the slurry having the unadjusted molar ratio, that is, the slurry before the adjustment of the molar ratio, are withdrawn from lines 10 and 7, respectively, mixed together, and fed to digester 30 through line 11. Digester 30 is a high pressure reactor such as an autoclave with a stirrer, and is usually heated to about 200° to 300° C, and retains the slurry therein for a time of substantially extracting alumina components from the alumina-containing ores.

Digester 30 is heated by injecting live steam directly therein through line 17, or by indirect heating through a heating tube provided in the digester.

The slurry containing alumina components extracted from the ore as sodium aluminate in digester 30 is withdrawn from line 12, cooled in evaporators for cooling 31, 32 and 33 through lines 13 and 14, and sent to a successive step through line 15.

The steam recovered in evaporators for cooling 31, 32 and 33 is usually utilized as a heat source for preheating the main stream of decomposition solution and the slurry. The slurry after extraction, coming from the ultimate evaporator for cooling 33 is sent to a blow-off tank through line 15, where the slurry is flashed to the atmospheric pressure. The slurry is then subjected to separation of red mud, and then seed aluminum hydroxide is added to the resulting clear sodium aluminate solution to effect deposition of aluminum hydroxide. The deposited aluminum hydroxide is then separated. The aluminum hydroxide thus obtained is calcined, whereas the decomposition solution resulting from the separation of aluminum hydroxide is recycled to line 1.

Figure 2:
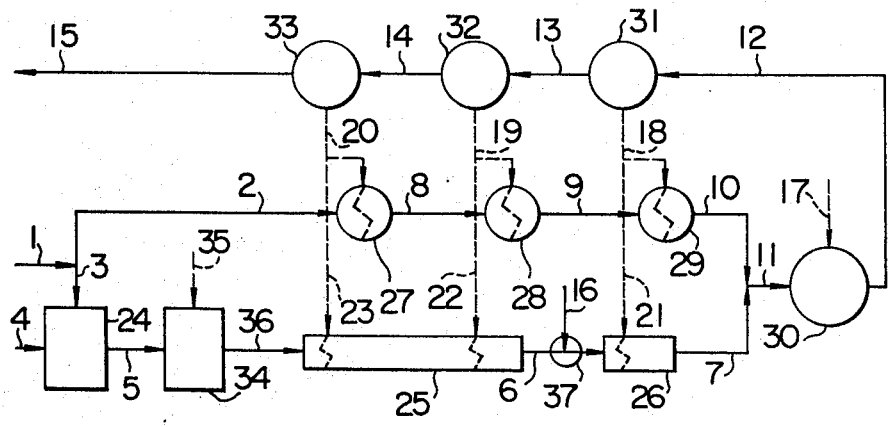
FIG. 2 is a flow diagram showing another embodiment of carrying out the present invention.

FIG. 2 shows another embodiment of the present process, where the slurry is subjected to preliminary desilication treatment, which is effected before the preheating step shown in FIG. 1. In FIG. 2, numerals 1–33 and 37 have the same items as in FIG. 1. The slurry prepared by mixing the alumina-containing ores with the side stream of decomposition solution in a slurry preparation tank 24 is led to preliminary desilication tank 34 through line 5, where the slurry is heated to a temperature above 70° C but below that of forming boehmite scales from the slurry with heat supplied from line 35, and kept therein until the silica in the slurry turns to the desired amount of desilication products.

As the preliminary desilication vessel, a tank is usually used. As a heat source through line 35, steam recovered in the evaporator for cooling is preferably used, but of course the heat from the outside of system can be used.

The slurry that has undergone the desired degree of desilication is led to slurry preheater 25 through line 36, and subjected to the further treatments as described referring to FIG. 1.

By carrying out the preliminary desilicating treatment as shown in FIG. 2, such a remarkable advantage can be attained that the formation of scales originating from the desilicating reaction and boehmite scales can be completely or substantially prevented in slurry preheaters 25 and 26. In the Figures, specific numbers of the evaporators for cooling, preheaters for decomposition solution, and slurry preheaters are indicated, but of course any desired numbers thereof can be used.

As described above, the formation of boehmite scales, which are hardly soluble in a mineral acid, on the inside surface of the slurry preheater can be completely or substantially prevented in the process for extracting alumina from bauxite slurry on the basis of a two-stream system according to the present invention, and thus steam utility can be considerably enhanced. When the present process is carried out in combination with the preliminary desilication treatment, the formation of scales on the inside surface of the slurry preheater can be completely or substantially prevented. Operating duration before the scale peeling operation must be conducted is usually extended to about 6 months in the present invention, whereas the operating duration is 0.7 months in the conventional process.

The present invention will be described in detail referring to Examples, but will not be restricted to these Examples.

EXAMPLE 1

Extraction of alumina from bauxite was carried out, using apparatus as shown in FIG. 1.

Recycled decomposition solution having a $SiO_2$ concentration of 0.4 to 0.5 g/l from line 1 was divided into main stream (78 parts by weight) and side stream (22 parts by weight). The main stream was led through line 2 to preheaters 27, 28 and 29, each consisting of a shell-and-tube type heat exchanger, and preheated to 210° C therein, whereas the side stream was led through line 3 to slurry preparation tank 24. To slurry preparation tank 24 was fed 10 parts by weight of bauxite having a $SiO_2$ content of 0.2% by weight through line 4 to prepare it into a slurry state. The resulting slurry had a molar ratio of $Na_2O/Al_2O_3$ of 0.52.

The slurry was led through line 5 to preheater 25 consisting of a double tube-type heat exchanger, and preheated to 130° C therein with steam recovered from slurry after extraction. Then, 37.6 parts by weight of the main stream of decomposition solution preheated to about 130° C was added from line 8 through line 16 to the slurry in retention vessel 37 for desilication reaction to adjust the molar ratio of $Na_2O/Al_2O_3$ of the slurry to 1.1. The slurry having the adjusted molar ratio was further led to preheater 26 consisting of a double tube-type heat exchanger, and preheated to 210° C therein with steam recovered from the slurry after extraction.

The main stream and the slurry after the preheating were withdrawn through lines 10 and 7, respectively, and led through line 11 to digester 30 to extract alumina. The digester was heated to about 245° C by injecting therein live steam from line 17.

For comparison, another extraction was carried out in the same manner as above, without conducting the adjustment of the molar ratio of the slurry by addition of alkali material.

In the above operation, the following items as shown in Table 1 were examined. Results are given in Table 1.

Table 1

| Slurry preheater No. | Steam utility (kg/ton-$Al_2O_3$) | Present process 1550 | Comparison 1550 |
| --- | --- | --- | --- |
| | Scale formation rate | | |

Table 1-continued

| Slurry preheater No. | Steam utility (kg/ton-Al₂O₃) | Present process 1550 | Comparison 1550 |
| --- | --- | --- | --- |
| 25 | $\left[\dfrac{1}{U^2}\text{ VS. Time (day)}\right]$ | $1.85 \times 10^{-8}$ | $1.85 \times 10^{-8}$ |
| | Operating duration | about 2 months | about 2 months |
| | Scale formation rate | | |
| 26 | $\left[\dfrac{1}{U^2}\text{ VS. Time (day)}\right]$ | $0.62 \times 10^{-8}$ | $5.32 \times 10^{-8}$ |
| | Operating duration | about 6 months | about 3 weeks |

Table 2

| Slurry preheater No. | Steam utility (kg/ton-Al₂O₃) | Present process 1550 | Comparison 1550 |
| --- | --- | --- | --- |
| | Scale formation rate | | |
| 25 | $\left[\dfrac{1}{U^2}\text{ VS. time (day)}\right]$ | $0.62 \times 10^{-8}$ | $0.62 \times 10^{-8}$ |
| | Operating duration | about 6 months | about 6 months |
| | Scale formation rate | | |
| 26 | $\left[\dfrac{1}{U^2}\text{ VS. time (day)}\right]$ | $0.62 \times 10^{-8}$ | $5.32 \times 10^{-8}$ |
| | Operating duration | about 6 months | about 3 weeks |

EXAMPLE 2

Extraction of alumina from bauxite was carried out, using apparatus as shown in FIG. 2.

Recycled decomposition solution having a $SiO_2$ concentration of 0.4 to 0.5 g/l from line 1 was divided into a main stream (85 parts by weight) and a side stream (15 parts by weight). The main stream was led through line 2 to preheaters 27, 28 and 29, each consisting of a shell-and-tube type heat exchanger, and preheated to 185° C therein, whereas the side stream is led through line 3 to slurry preparation tank 24. To slurry preparation tank 24 was supplied 10 parts by weight of bauxite having a $SiO_2$ content of 4 % by weight through line 4 to prepare it in a slurry state. The resulting slurry had a molar ratio of $Na_2O/Al_2O_3$ of 0.48.

The slurry was led through line 5 to preliminary desilication vessel 34, heated to 90° C by supplying thereto steam recovered from slurry after extraction through line 35, and kept at that temperature for 5 hours therein to effect preliminary desilication. Then, the slurry after the preliminary desilication was led through line 36 to preheater 25 consisting of a double tube-type heat exchanger, and preheated to 150° C with steam recovered from the slurry after extraction. Then, 34 parts by weight of the main stream of decomposition solution preheated to about 150° C was added from line 9 through line 16 to the slurry in retention vessel for desilication reaction 37 to adjust the molar ratio of $Na_2O/Al_2O_3$ of the slurry to 1.1. The slurry having the adjusted molar ratio was further preheated to 185° C with steam recovered from the slurry after extraction.

The main stream of decomposition solution and the slurry after the preheating were withdrawn through lines 10 and 7, respectively, and led through line 11 to digester 30 to extract alumina. The digester was heated to about 220° C by injecting therein live steam from line 17.

For comparison, another extraction was carried out in the same manner as above, without conducting the adjustment of the molar ratio of the slurry by addition of alkali material.

In the above operation, the following items as shown in Table 2 were examined. Results are given in Table 2.

It is seen from the foregoing tables that the present invention is considerably superior to the conventional art.

What is claimed is:

1. In a process for extracting alumina from alumina-containing ores by individually preheating a slurry of alumina-containing ores in alkali solution, and an alkali solution, and feeding the preheated slurry and the preheated alkali solution to a digester maintained at a temperature of about 200° to about 300° C, thereby extracting alumina from the alumina-containing ores, the improvement which comprises preparing from the alumina-containing ores and the alkali solution a slurry having a molar ratio of $Na_2O/Al_2O_3$ of not more than 1, adding an alkali material, which comprises recycled decomposition solution, extracted slurry or alkali solution from outside the extracting process, to the slurry while preheating the slurry before the slurry reaches a temperature of forming scales originating from deposition of boehmite-type alumina from the slurry, thereby obtaining the slurry having an adjusted molar ratio of $Na_2O/Al_2O_3$ of more than 1, further preheating the slurry having the adjusted molar ratio to a temperature higher than that of forming scales originating from deposition of boehmite-type alumina from the slurry before the adjustment of the molar ratio, and then feeding the preheated slurry and a separately preheated alkali solution to the digester, thereby extracting the alumina from the alumina-containing ores in the slurry.

2. A process according to claim 1, wherein the slurry prepared by mixing the ore with the alkali solution has a molar ratio of $Na_2O/Al_2O_3$ of 0.2 –1.

3. A process according to claim 2, wherein the slurry has a molar ratio of $Na_2O/Al_2O_3$ of 0.3–0.8.

4. A process according to claim 1, wherein the slurry after the adjustment of the molar ratio of $Na_2O/Al_2O_3$ by the addition of the alkali material has a ratio of 1.05 to 1.3.

5. A process according to claim 1, wherein the addition of the alkali material is carried out at about 130° to about 170° C.

6. A process according to claim 1, wherein the addition of the alkali material is carried out in a retention vessel for desilication reaction at a position having a temperature of about 130° to 170° C.

7. A process according to claim 6, wherein the slurry is kept at 130° to 170° C in the retention vessel for a retention time of at least 3 minutes.

8. A process according to claim 7, wherein the retention time is 5 to 60 minutes.

9. A process according to claim 1, wherein the further preheating of the slurry is effected at least at 170° C.

10. A process according to claim 1, additionally comprising subjecting the slurry to a preliminary desilication treatment before adding the alkali material while preheating.

11. A process according to claim 10, wherein the preliminary desilication treatment is carried out at a temperature above 70° C and below a temperature of forming the scales originating from deposition of boehmite-type alumina from the slurry.

12. A process according to claim 11 wherein the preliminary desilication treatment is carried out at 80° C to a boiling point of the slurry under the atmospheric pressure.

* * * * *